United States Patent
Shutov et al.

[11] Patent Number: 5,395,055
[45] Date of Patent: Mar. 7, 1995

[54] SOLID STATE SHEAR EXTRUSION PULVERIZATION

[75] Inventors: Fyodor Shutov, Downers Grove; George Ivanov, Chicago; Hamid Arastoopour, Darien, all of Ill.

[73] Assignee: Illinois Institute of Technology, Chicago, Ill.

[21] Appl. No.: 140,640

[22] Filed: Oct. 28, 1993

Related U.S. Application Data

[63] Continuation-in-part of Ser. No. 85,198, Jun. 30, 1993, abandoned, which is a continuation-in-part of Ser. No. 981,161, Nov. 24, 1992, abandoned, which is a continuation-in-part of Ser. No. 971,147, Nov. 3, 1992, abandoned.

[51] Int. Cl.6 .................................................. B02C 23/28
[52] U.S. Cl. .................................... 241/16; 241/17; 241/23; 241/65; 241/260.1; 241/261; 366/85; 366/88; 366/89
[58] Field of Search .................. 241/16, 17, 23, 60, 241/65, 260.1, 261; 264/211.18, 211.23; 425/204, 208, 379.1; 366/83, 84, 85, 88, 89

[56] References Cited

U.S. PATENT DOCUMENTS

| | | | |
|---|---|---|---|
| 3,102,716 | 9/1963 | Frenkel | 366/88 |
| 3,104,420 | 9/1963 | Sellbach | 366/88 X |
| 3,164,375 | 1/1965 | Frenkel | 366/89 X |
| 3,525,124 | 8/1970 | Ocker . | |
| 3,728,053 | 4/1973 | Stillhard et al. | 425/208 X |
| 3,814,566 | 6/1974 | Sharp | 425/371.1 X |
| 3,874,835 | 4/1975 | Rosater et al. | 241/60 X |
| 3,889,889 | 6/1975 | Sawa . | |
| 4,041,115 | 8/1977 | Jenkins et al. . | |
| 4,090,670 | 5/1978 | Bennett . | |
| 4,098,463 | 7/1978 | Lowry . | |
| 4,118,163 | 10/1978 | Lee | 366/88 X |
| 4,181,647 | 1/1980 | Beach | 366/89 X |
| 4,184,772 | 1/1980 | Meyer | 366/89 X |
| 4,367,190 | 1/1983 | Buch | 425/208 X |
| 4,408,888 | 10/1983 | Hanslik | 366/89 X |
| 4,511,091 | 4/1985 | Vasco . | |
| 4,607,796 | 8/1986 | Enikolopov et al. . | |
| 4,607,797 | 8/1986 | Enikolopow et al. . | |
| 4,650,126 | 3/1987 | Feder et al. . | |
| 4,708,617 | 11/1987 | Herrington | 425/208 X |
| 4,716,000 | 12/1987 | Kerschbaum et al. | 425/708 X |
| 4,875,847 | 10/1989 | Wenger et al. . | |
| 4,890,996 | 1/1990 | Shimizu . | |
| 4,968,463 | 11/1990 | Levasseur . | |
| 4,997,131 | 3/1991 | Talonen | 241/260.1 X |
| 5,026,512 | 6/1991 | Chang . | |
| 5,073,320 | 12/1991 | Stezel | 264/211.23 X |
| 5,088,914 | 2/1992 | Brambrlla | 366/88 X |

FOREIGN PATENT DOCUMENTS

| | | |
|---|---|---|
| 9114552 | 10/1991 | European Pat. Off. . |
| 2196242 | 3/1974 | France . |
| 3332629 | 3/1985 | Germany . |
| 4021550 | 1/1991 | Germany . |
| 4130315 | 1/1993 | Germany . |
| 334404 | 1/1959 | Switzerland . |
| 456937 | 7/1968 | Switzerland . |
| 1184717 | 3/1970 | United Kingdom . |

OTHER PUBLICATIONS

Nikoli S. Enikolopian, "Some Aspects of Chemistry and Physics of Plastic Flow", Pure & Appl. Chem., vol. 57, No. 11, pp. 1707–1711, (1985).
Amer. Inst. Chem. Engrs; 1992 Annual Meeting, Nov. 1–6, 1992 Thermoplastic Waste Recycling Process Using Solid State Shear Extrus Extended Abstracts, p. 441, Abstract No. 187e.

*Primary Examiner*—Frances Han
*Attorney, Agent, or Firm*—Speckman, Pauley & Fejer

[57] ABSTRACT

A process and apparatus for pulverization of thermosetting, crosslinked thermoplastic and natural polymeric materials by applying normal and shear stresses by oppositely rotating meshing conical screws sufficient to form fine powder. The process may be conducted at relatively low temperatures, and in the case of many materials, at ambient or near ambient temperature and pressure conditions. The fine powder may be fluidized to aid in its discharge.

32 Claims, 2 Drawing Sheets

| FEEDING | HEATING | COOLING / POWDERIZATION | FLUIDIZING |
|---------|---------|-------------------------|------------|
| ZONE (1) | ZONE (2) | ZONE (3) | ZONE (4) |

SOLID STATE SHEAR EXTRUSION PULVERIZATION

This application is a continuation-in-part of application Ser. No. 08/085,198, filed Jun. 30, 1993, now abandoned, as a continuation-in-part of application Ser. No. 07/981,161, filed Nov. 24, 1992, now abandoned, as a continuation-in-part of application Ser. No. 07/971,147, filed Nov. 3, 1992, now abandoned.

BACKGROUND OF THE INVENTION

1. Field of the Invention

This invention relates to a solid state shear extrusion process and apparatus for continuous pulverization to fine particles of a wide variety of solids and their mixtures, such as, polymers, polymer composites, copolymers, homopolymers, agrowastes, wood chips, and mixtures of synthetic and natural polymers which have been resistant to such fine pulverization. The invention is particularly well suited for fine pulverization of thermosetting, crosslinked thermoplastic and natural polymeric materials. The invention is especially well suited for fine pulverization of synthetic polymeric foams, such as polyurethane foams. The process and apparatus of this invention is especially useful for recycling of synthetic and natural polymers and mixed polymer wastes using a non-cryogenic and low power consumption technique.

2. Description of Related Art

Currently, three basic reclaiming processes of virgin and used plastics are practiced: Chemical, which include chemical treatment, as well as depolymerization hydrolysis, pyrolysis and incineration; Physical, which include melting and subsequent extrusion, injection molding, and pressure molding; and Mechanical, which include granulation, densification, agglomeration, and pulverization. Presently used processes have disadvantages of high energy consumption, decrease in original properties of the polymers, applicability to only specific polymers, and environmental undesirability.

U.S. Pat. No. 4,090,670 teaches recovery of rubber from scrap vulcanized rubber tires by raising the surface temperature sufficiently to devulcanize followed by removal of the devulcanized material, such as by rasping. This method is limited to rubber and does not produce fine powders as desired for many reuse applications.

Reclamation of thermoplastic materials including shredding, grinding and comminuting is exemplified by: U.S. Pat. No. 4,968,463 teaching shredding waste plastic to about 100 mm and grinding to under about 40 mm, followed by drying, preheating to 80° to 160° C., kneading at 120° to 250° C. and injection molding or extrusion; U.S. Pat. No. 4,650,126 teaching heating plastic particles to melt the surface to retain a grinding aid thereon and maintaining a counter-rotating attrition mill at a temperature to retain nearly all of the grinding aid on the softened polymer particles during grinding, followed by an air stream which serves to separate the grinding aid and as a material carrier medium; U.S. Pat. No. 4,511,091 teaching thermoplastic scrap recovery combined with phonograph record pressing wherein the hot trimmed waste is cooled, ground, and mixed with virgin material for formation of phonograph records; and U.S. Pat. No. 4,098,463 teaching a liquid cooling spray to maintain the temperature in a cutting chamber such that the plastic is hard which reduces the fibers imbedded in the comminuted particles from plastic electrical or telephone cord insulation.

Various screw devices are known for conveyance and processing in the synthetic polymer industry. Molding of products from a mixture of thermoplastic polymers or a thermoplastic polymer and an inorganic material by control of crystallization in a screw extruder with temperature control in a first portion within 35° C. below the material melting point and the temperature in a second portion within 35° C. above the material melting point with the maximum temperature at the outlet is taught by U.S. Pat. No. 5,026,512. U.S. Pat. No. 4,890,996 teaches continuous granulating by melting, kneading and granulating polymers wherein a double screw kneader without lateral communication is capable of adjusting the degree to which material is kneaded by axial adjustment of the cylinders and screws with respect to each other.

Conical screw sections are known to be used for specific purposes. U.S. Pat. No. 4,875,847 teaches a twin screw extruder, especially suited for viscous materials, having frusto-conical screw sections and separate barrel sections at the outlet end providing bearing-type support for the separate screws. U.S. Pat. No. 3,525,124 teaches an extracting apparatus having screw-threaded shafts rotatable within a housing and having conveying and milling sections with an obstruction section between for pressure sealing. The screw and the housing may be tapered to form the obstruction section, thereby providing independent heat and pressure control in the conveying and milling sections.

Chemical and physical aspects of transformations of polymeric materials, such as pulverization, under simultaneous high pressure and shear is described in Nikolai S. Enikolopian, "Some Aspects of Chemistry and Physics of Plastic Flow", Pure & Appl Chem., Vol 57, No 11, pp 1707–1711, (1985).

U.S. Pat. No. 4,607,797 teaches pulverization of fused polymers in an extrusion apparatus having a barrel with at least one cylindrical rotatable screw. When two screws are used, they are co-rotational. The '797 patent teaches that material is fed to one end of the barrel, heated to above its fusing temperature in a first zone, cooled to below its solidification temperature with simultaneous pre-crushing and pulverizing of the solidified material in a second zone, and discharge of the powdered material from the opposite end of the barrel. Screw action is used to convey the material through the barrel and substantially elliptical or triangular kneading or pulverizing discs non-rotably mounted on the screw in the cooling zone provide the pre-crushing and pulverizing. The process is carried out at 0.25 to 0.30 MPa. This process is said to continuously produce particles having a very uniform grain size, in the case of polyethylene only 2% larger than 160 microns. The '797 patent distinguishes its process from the prior art by allowing solidification of the fused material within the extrusion apparatus.

U.S. Pat. No. 4,607,796 teaches pulverization of rubber and vulcanization products in a standard single- or multiple-screw extruder by compressing at a pressure of 0.2 to 0.7 MPa, then subjecting the compressed material to a shear force of 0.03 to 5N/mm² at a pressure of 0.2 to 50 MPa and temperature of 80° to 250° C. forming hot sheared material which is subjected to a shearing force of 0.03 to 5 N/mm² at a pressure of 0.2 to 50 MPa and temperature of 15° to 60° C. forming cooled powder material. Addition of granulated polyethylene to butyl rubbers is necessary to obtain finely dispersed powders. This process is said to result in particles not exceeding 500 micrometers in the case of natural rubber and 300 micrometers with other rubbers.

SUMMARY OF THE INVENTION

Natural and synthetic polymer wastes are increasing and environmental concerns about their disposition render recycling necessary. Thermosetting polymers, especially foamed polyurethane, have large commercial uses and present a nearly intractable recycling problem. Currently, most foamed polyurethane waste ends up in landfills where it is resistant to decomposition or in waste burners where it produces highly toxic gaseous products. Many reclamation processes to date have been limited to specific types of wastes, and particularly limited with respect to mixed wastes, rendering them uneconomical, particularly with respect to energy consumption. Present reclamation processes have not provided reclaimed material in a form conducive to re-use manufacturing. Solid state shear extrusion pulverization according to this invention requires low energy input, a small fraction of the energy required in presently used cryogenic pulverization, and provides finer and more uniform powders which may be used in a broader range of re-use or end use manufacture, than pulverization techniques presently known to the inventors.

It is one object of this invention to provide a low energy consumption process and apparatus for pulverization of polymeric materials, particularly thermosetting and crosslinked thermoplastic polymers, such as foams, to fine powders.

It is another object of this invention to provide a process and apparatus for pulverization of a wide variety of natural and synthetic thermosetting and crosslinked thermoplastic polymeric materials under mild conditions, at or near ambient temperatures and relatively low pressures, to form a fine powder.

Yet another object of this invention is to provide a process and apparatus suitable for economical recycling of a wide variety of natural and synthetic thermosetting and crosslinked thermoplastic polymer wastes, including mixed wastes, by solid state shear extrusion pulverization of such waste materials forming fine powders suitable for use in new product production.

Another object of this invention is to provide fine polymeric particles for coating and preservation of metals, stones and concretes, such as used in monuments, buildings, and bridges, and concrete and metal pipes and materials exposed to corrosive environments. The object is to provide a substitute for liquid paints and coatings based upon organic non-environmentally friendly solvents with fine particles coatings which are more durable, stable and environmentally safe when applied to surfaces, especially metal and porous mineral surfaces.

Yet another object of this invention is to provide a process and apparatus for conduct of solid state shear extrusion pulverization of thermosetting polymeric materials, such as polyurethane, polyisocyanate, epoxy and phenolic foams; crosslinked thermoplastic polymeric materials, such as polyethylene, polypropylene and polyvinyl chloride foams; and natural polymers, such as wheat, corn and wood, under ambient or near ambient temperatures and pressures, to result in powders having very fine particle size.

These and other objects and advantages of the invention are achieved by applying normal and shear forces with conically shaped counter-rotating meshing screws sufficient to form fine powder of the polymeric material, Suitable forces may be applied by torque up to about 40 MKg and pressure up to about 150 psig. Powders having a major portion of the particles with a weight average size of about 100 to about 900 microns can be produced in a single pass. Multiple passes by reprocessing through the same apparatus or by passing through at least one additional similar apparatus, of oversized particles can result in a weight average particle size of 100 microns and less.

The process of this invention may be carried out on a continuous basis in a solid state shear extrusion pulverizer having a hollow generally converging barrel housing a generally converging twin screw extruder having generally converging conical meshing screws in at least the powder formation zone. Feed means are provided to feed polymeric material to a first zone at one end of the barrel and discharge means are provided for removal of pulverized powder from the opposite end of the barrel. The materials screw feed in the first zone. Heating means may provided for any desired heating of thermosetting, crosslinked thermoplastic and/or natural polymeric material in a second zone to temperatures of above ambient and below its decomposition temperature prior to applying the high normal and shear forces. Cooling means may be provided for cooling the polymeric material in a third zone adjacent the second zone to temperatures of about 20° to about 100° C. immediately prior to or during applying the normal and shear forces. The thermosetting and/or crosslinked thermoplastic polymeric materials need not be heated to premelt temperatures and cooled as described in our parent applications with respect to thermoplastic polymers, but may be treated at ambient temperatures, or with heating and cooling as noted above. Means for applying normal and shear forces sufficient to form fine powders may be provided in the second and/or third zone(s). Means may provided for fluidizing and further cooling the fine powder produced from thermosetting, crosslinked thermoplastic and natural polymeric materials in a gas stream in the latter portion of the third zone and in a fourth zone to provide expansion of the powder and to facilitate discharge of the fine powder. Increase of the barrel diameter and increase in distances between the screw flights in the fourth zone may also be used to expand the fines for easy discharge. Agglomeration has not been a problem in pulverization of thermosetting and crosslinked thermoplastic polymeric materials according to the process of this invention and, therefore, the fine powder may be discharged directly from the third zone, if desired. However, if the fine powder is damp or sticky, fluidization considerably decreases agglomeration of the fine powder.

The solid state shear extrusion pulverization process and apparatus of this invention provides continuous very fine pulverization of polymeric materials which have been recalcitrant to fine pulverization by prior processes and apparatus. The process of this invention uses low pressure and temperatures closer to ambient than prior processes with the major amount of supplied energy to the process being utilized to create normal and shear stresses on the particles to result in the very fine powder with low energy input. In pulverization of thermoplastic polymeric materials, as described in our parent patent applications, it was necessary to heat the polymeric material to higher temperatures than general ambient followed by cooling and application of shear and normal stresses to obtain fine pulverization. It was unexpected that the pulverization process of this invention could be carried out using thermosetting and cross-linked thermoplastic polymers at near ambient conditions without significant heating and cooling, as required for thermoplastic polymers described in our parent patent applications. The conically shaped counter-rotating meshing screws used in this invention aid to provide sufficiently high shear and normal forces to produce the desired fine powder. In the process of the present invention, slight heating followed by cooling may be used to generally facilitate the processing. The process and apparatus of this invention are applicable to a variety of polymers, such as, thermosetting polymers, such as polyurethane, polyisocyanurate, epoxy and phenolic polymers, particularly foams, and crosslinked thermoplastic polymers, such as polyethylene, polypropylene and polyvinyl chloride polymers, particularly foams, natural polymers, such as, wood, wheat and corn, and copolymers. The fine polymeric powder produced by the process and apparatus of this invention enables much broader end uses as fillers and reinforcement agents in many types of matrices, such as polymer, ceramic, gypsum, concrete, and asphalt. This is important to practical utilization of products of recycling polymer wastes, both pre- and/or post-consumer, to reduce the environmental problems caused by such solid wastes.

BRIEF DESCRIPTION OF THE DRAWINGS

The above objects and further advantages of the invention will be apparent upon reading the preferred embodiments and reference to the drawing, wherein.

DESCRIPTION OF PREFERRED EMBODIMENTS

In the process of solid state shear extrusion pulverization according to this invention, granules, flakes or shreds of virgin or used synthetic or natural polymer, polymer composites, copolymer and homopolymer materials, or a mixture of such materials, specifically thermosetting polymers, cross-linked thermoplastic polymers and/or natural polymers, are fed by any suitable feed means to a first zone at the large end of a hollow generally converging barrel housing a generally converging twin screw extruder having generally converging conical meshing screws. By the terminology "generally converging", it is meant that at least in the powder formation zone, the cross section of the feed ends of the barrel and the screws are larger than the opposite discharge ends and in the powder formation zone, the convergence is continuous, forming conical screws in at least that zone. This terminology is intended to allow a larger shaped end section and smaller central sections, for example to accommodate bearing means. Generally, the barrel and screws may be cylindrical in the feed zone, have a definite conical convergence in the powder formation zone, and provide a powder expansion cross sectional area in the fourth or fluidizing zone. In preferred embodiments, continuously converging conical screws are used for the entire length of a barrel having converging walls in the powderization zone followed by diverging walls in the fluidizing zone.

Figure 1:
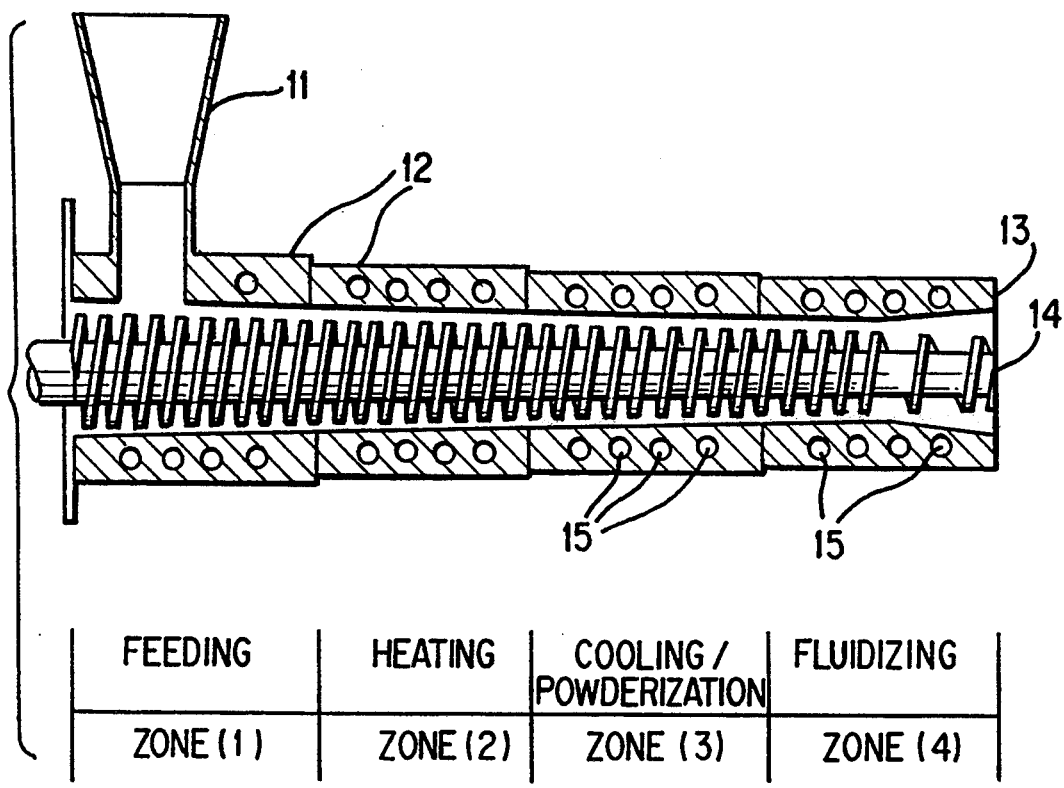
FIG. 1 is a longitudinal sectional view showing a conical counter-rotating screw apparatus according to one embodiment of this invention.
Figure 2:
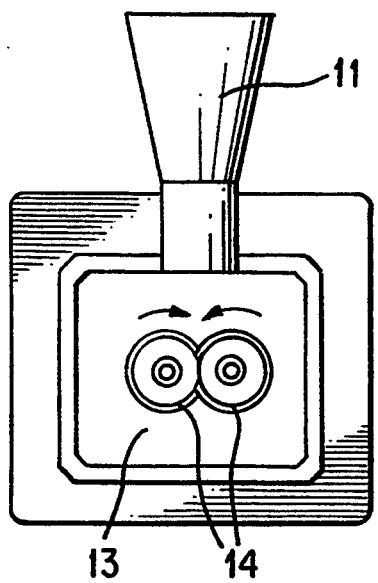
FIG. 2 is an end view of the apparatus shown in FIG. 1.

FIG. 1 is a longitudinal sectional view of an apparatus according to this invention, suitable for use with thermoplastic or thermosetting polymeric material, showing feed hopper 11 for feeding polymer materials to feeding zone 1 within barrel 13 housing screws 14. Heaters 12 may be provided in barrel walls in the region of heating zone 2 for supplying external heat to the material being treated, if desired. Cooling conduits 15 may be provided in barrel walls in the region of cooling/powderization zone 3 and may be provided in the region of cooling/fluidization zone 4 for further cooling the powdered product. Cooling in zones 3 and/or 4 may be enhanced, if desired, by directly cooling the screws in these zones by introducing a stream of cold fluid to the center of the screws. The heating and cooling means may be inactivated when using thermosetting, cross-linked thermoplastic and natural polymeric materials for which heating and/or cooling is not desired for specific materials, or may be entirely eliminated when the apparatus is to be used solely for these materials. Increase in the diameter of the barrel opening in fluidizing zone 4 is shown. Also, increase in spacing of the flights on screw 14 in cooling/fluidizing zone 4 is shown. FIG. 2 shows the counter rotation of screws 14 within barrel 13.

The polymeric feed material may be fed to the first zone in a size range equal or less than the distance between screw flights and their depths, preferably about 1 mm to about 6 mm. Size reduction to these dimensions may be achieved by many methods known to the art. Generally, high resilient, flexible and rigid thermosetting, crosslinked thermoplastic and natural polymeric materials and their mixtures may be used in the process of this invention. The process of this invention is particularly suitable for foam materials. Suitable crosslinked thermoplastic polymeric materials include crosslinked polyethylene, polypropylene and polyvinyl chloride, particularly their foams. Suitable thermosetting polymeric materials include low density, 20 to 100 $Kg/m^3$, rigid, flexible and high resilient polyurethane, as well as polyisocyanurate and resol phenol-formaldehyde and epoxy polymers, particularly their foams. Natural polymers such as wood, wheat and corn may be used. Mixtures of these materials or composites may be used. When materials recalcitrant to fine pulverization are present alone, it is desirable to form a mixture of such materials with at least one material which is readily pulverized to the desired fine particles by the process of this invention. Minor amounts of readily pulverized materials, about 5 to about 50 volume percent, depending greatly upon the materials, may be mixed with such recalcitrant materials to result in fine powder formation according to this invention. To accommodate recycling of waste polymeric materials, it may be desirable to have present minor amounts, up to about 30 volume percent, of pulverizable materials.

Heating means capable of heating the thermosetting, crosslinked thermoplastic or natural polymeric material in the second or heating zone may be located in a suitable manner to achieve the desired above ambient and below the decomposition temperature, which upon cooling the polymeric material provides additional shear stress to result in high deformation. Generally temperatures up to about 225° C. are suitable to facilitate powderization according to this invention, but as stated above, with some thermosetting, crosslinked thermoplastic and natural polymeric materials powderization is not benefitted by heating and cooling which may be omitted from the process and apparatus in those cases. When using thermosetting, crosslinked thermoplastic or natural polymeric materials, the temperature in the second zone may be at or near ambient, or the material may be heated to about 25° to about 225° C., preferably about 75° to about 200° C. Any suitable heating means known to the art may be used, for example, the barrel may be electrically heated or a fluid heating jacket surrounding the barrel may be used in this region. In the second or heating zone, the meshing screws serve primarily to convey the material through the zone with an appropriate residence time to achieve the desired heating prior to entry to an adjacent cooling/powderization zone.

Cooling means immediately prior to or during pulverization in the third or cooling/powderization zone capable of cooling to about 20° to about 100° C., and preferably about ambient to about 45° C., polymeric material heated in the second zone, may be located in a suitable manner to achieve the desired temperature. Any suitable cooling means known to the art may be used, for example, a fluid, liquid or gas, cooling jacket surrounding the barrel or direct barrel cooling may use chilled water or cold air in this region. In the upstream portion of the length of the third zone where cooling from the higher temperature takes place, the meshing screws serve primarily to convey and material through this region with an appropriate residence time to achieve the desired cooling. Cooling of thermosetting, crosslinked thermoplastic and natural polymeric materials in the third zone imparts normal and shear stresses in the thin solid material. A pressure of about 0 to about 150 psig may be maintained in this portion of the barrel. Concurrently with formation of these normal and shear stresses in the third zone and in an adjacent upstream end of the fourth zone, it is desired that the meshing screws be conically shaped and mated to provide additional normal and shear stresses to the material sufficient to form fine powder. Up to about 40 MKg torque is obtained in the process of this invention, generally about 0.2 to about 8 MKg torque is suitable.

The conically shaped meshing screws and processing parameters must be designed to provide sufficient residence time for formation of powder from a substantial portion of the material in the third zone and to provide necessary stresses to the material to achieve formation of the very fine powder of the above defined sizes. We have found that the conical shape and counter-rotation of the screws aid in imparting desired high stresses to the polymeric material. Drive means as known to the art are provided to rotate the opposing screws at about 4 to about 90 RPM, preferably about 8 to about 75 RPM.

The very fine powder is passed to the fourth zone where the cross sectional open area barrel is expanded and gas introduced sufficient to fluidize the powder to convey the powder through a discharge means in the fourth zone. We have not found agglomeration of powder produced from thermosetting, crosslinked thermoplastic and natural polymers to be a problem. However, if the material is damp or sticky, agglomeration may become a problem which fluidization will reduce. Any gas which is not chemically reactive with the powder material may be used as a fluidizing gas. Air at ambient temperature is a preferred fluidizing gas which additionally cools higher temperature powder. The fluidizing gas may be introduced to the hollow barrel in the fourth zone by any suitable method known to the art. The cross sectional open area may be suitably expanded by reduction of the cross sectional area of the screw, increase in distance between flights of the screw, or by reduction of the taper or actual divergence of the barrel housing. The fluidized very fine powder may be discharged from a suitable opening in the barrel housing.

The aspect of this invention relating to fluidizing pulverized powder in a gas stream following pulverization to prevent its agglomeration and for control of discharge from the apparatus is applicable to any process for solid state pulverization by shear extrusion. The fluidizing is carried out in an expanding volume which may be provided by a diverging chamber and by providing larger distances between flights of a screw passing through such a fluidized zone. It may be further desired that the fluidized powder is cooled in an expanding volume zone. These features aid in expanding the powder from a packed bed condition to a fluidized bed condition releasing forces from the contacting particles and basically float them, significantly preventing agglomeration and providing controlled discharge of the finely powdered material.

For reprocessing, means are provided for passing at least separated oversized formed particles back to the feed means of the same solid state shear extrusion pulverizer or to another similar apparatus for reprocessing. A plurality of similar apparatus may be used in series to provide continuous production and use of most advantageous operating conditions for different size particles. In preferred embodiments, separation of produced particles over a preset desired size may be achieved by any suitable sizing means, such as a sieve, and oversized particles conveyed by any suitable means to the feed means of a solid state shear extrusion pulverizer as described above. Using reprocessing, a powder having particles of weight average size of less than 100 microns can be readily achieved.

Figure 3A:
FIGS. 3A and 3B are scanning electron micrographs of polyurethane powder obtained according to this invention from rigid (3A) and high-resilient (3B) polyurethane foam wastes, respectively.
Figure 3B:

In many embodiments, the average fine powder particle sizes obtained using the process and apparatus of this invention is less than about 150 microns. FIGS. 3A and 3B are scanning electron micrographs of powder from rigid and high-resilient polyurethane foam wastes treated as more fully described in the Examples. It is seen that the fine particles of polyurethane are elongated shapes with a diameter:length, or aspect ratio, of 1:2 to 1:5 rendering them particularly well suited for filler/reinforcing agents to improve the strength, durability and lifetime of manufactured materials.

The following specific examples are set forth using specific materials, apparatus and process conditions, to further explain the invention and should not be considered to limit the invention in any way.

Example I

High-resilient polyurethane foam waste scraps having irregular shapes and sized about 15 to 25 mm, apparent density of 2 lb/ft$^3$ or 32 kg/m$^3$, were fed to the first zone at the large end of a continuously converging barrel housing two continuously converging conical shaped non-modular meshing screws, as shown in FIG. 1. The conical screws had a length of 14 inches and diameters from 1.67 inch at the large end to 1.0 inch at the small end and were driven by a geared electric motor in counter rotation at 45 RPM. Torque was between 3.0 and 5.0 MKg. A gage pressure of 0.10 MPa was maintained within the barrel in heating zone 2 and atmospheric pressure was maintained in the cooling and powder formation zone 3. The temperature at a location close to the barrel wall in zone 2 was maintained at 100° C. by electric heaters. Cooling was provided to zone 3 by chilled water jackets surrounding the barrel housing to cool the polyurethane powder to 45° C. near the barrel wall. The resulting polyurethane powder had an average size of 147 microns with about 50 percent of the particles less than 150 microns and 10 percent larger than 250 microns. No particles of 400 microns or larger were produced

Example II

The same polyurethane foam waste scraps as used in Example I were fed to the same apparatus as used in Example I except that no external heating was applied to zone 2 and no external cooling was applied to zone 3. The conical screws were driven in counter rotation at 66 RPM. Torque was 4.8 to 6.0 MKg. A gage pressure of 0.10 MPa was maintained in zone 2 and atmospheric pressure maintained in zones 3 and 4. Room temperature air was added to the downstream end of zone 3 to fluidize the fine powder for removal from the apparatus. The resulting powder had an average size of 205 microns and a size range of 150 to 260 microns. The fine powder particles from high-resilient polyurethane foam have elongated shapes with an aspect ratio of 1:2 to 1:5, as shown in the scanning electron micrographs of FIGS. 3A and 3B. In this example, the heat generated due to friction and the heat loss to the surroundings and polyurethane materials resulted in material at a temperature of 85° C. in heating zone 2 and 65° C. in cooling zone 3. Unexpectedly, the rate of heat generation due to friction and heat loss to surroundings provides a temperature range suitable to produce fine powders with elongated shapes similar to fibers. Elimination of the requirement for external heating and cooling results in considerable process savings.

Example III

Low density flexible polyurethane foam waste having particles of irregular shapes and sized about 1 mm was fed to the same apparatus as used in Example I. The conical screws were driven in counter rotation at 90 RPM. Torque was between 5 and 7 MKg. The temperature at a location close to the barrel wall in zone 2 was maintained at 100° C. by electric heaters. Cooling was provided to zone 3 by chilled water jackets surrounding the barrel housing to cool the polyurethane powder to 25° C. near the barrel wall. Room temperature air was added to the downstream end of zone 3 to fluidize the fine powder and to further cool the powder. The resulting polyurethane powder had an average size of 115 microns. More than 90 percent of the particles were sized less than 200 microns. No particles larger than 300 microns were obtained.

Example IV

High density polyurethane foam waste having particles of irregular shapes and sized about 1 mm, was fed to the same apparatus as used in Example I. The conical screws were driven in counter rotation at 55 RPM. Torque was between 5 and 7 MKg. The temperature at a location close to the barrel wall in zone 2 was maintained at 100° C. by electric heaters. Cooling was provided to zone 3 by chilled water jackets surrounding the barrel housing to cool the polyurethane powder to 25° C. near the barrel wall. Room temperature air was added to the downstream end of zone 3 to fluidize the fine powder. The resulting powder had an average size of 135 microns. About 80 percent of the particles were less than 200 microns and 25 percent of the particles less than 100 microns.

Example V

Cross-linked polyethylene foam scraps with irregular shapes and sized about 15 to 25 mm, apparent density of 1.2 lb/ft$^3$ or 20 kg/m$^3$, were fed to the same apparatus as used in Example I. The conical screws were driven in counter rotation at 45 RPM. Torque was between 5 and 7 MKg. The temperature at a location close to the barrel wall in zone 2 was maintained at 65° C. by electric heaters. Cooling was provided to zone 3 by chilled water jackets surrounding the barrel housing to cool the powder to 25° C. near the barrel wall. The resulting powder had about 23 percent of the particles less than 425 microns and 45 percent of the particles larger than 800 microns. Less than 5 percent of the particles had sizes less than 177 microns.

Example VI

Cross-linked polyethylene foam particles produced in Example V were recycled through the same apparatus and under the same operating conditions as Example V, except at a lower torque range of 3 to 6 MKg and higher screw rotation of 90 RPM. The reprocessing significantly reduced the particles sizes with the resultant powder containing no particles larger than 800 microns. More than 80 percent of the particles were smaller than 425 microns and about 35 percent of the particles were smaller than 177 microns. It is expected that reprocessing the larger particles, over about 200 microns, would reduce the particle size substantially as a function of the number of passes of oversized particle through the apparatus.

Using a pilot scale solid state shear extruder, it is expected that, with better materials and more accurate and uniform clearance between the screws and the barrel, the result will be a significant reduction, or probable elimination, of by passing particles. Further, sieves were used in the particle size distribution analysis which, in general, resulted in larger apparent particle sizes due to agglomeration and improper orientation of the particles on the sieves during shaking of the trays.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for solid state shear extrusion pulverization of polymeric materials selected from the group consisting of thermosetting, crosslinked thermoplastic, natural polymers and mixtures thereof comprising; applying normal and shear forces by conically shaped counter-rotating meshing screws rotated at about 4 to about 90 RPM sufficient to form fine powder of said polymeric material.

2. A process for solid state shear extrusion pulverization according to claim 1 wherein up to about 20 MKg torque is obtained.

3. A process for solid state sheer extrusion pulverization according to claim 1 wherein up to about 10 MKg torque is obtained.

4. A process for solid state shear extrusion pulverization according to claim 1 wherein said polymeric material is heated to a temperature above ambient and below its decomposition temperature prior to applying said normal and shear forces.

5. A process for solid state shear extrusion pulverization according to claim 4 wherein said heated polymeric material is cooled to about 20° to about 100° C. immediately prior to or during applying said normal and shear forces.

6. A process for solid state shear extrusion pulverization according to claim 5 wherein said heated polymeric material is cooled to about 20° to about 45° C.

7. A process for solid state shear extrusion pulverization according to claim 1 wherein said polymeric material is heated to about 25° to about 225° C. prior to applying said normal and shear forces.

8. A process for solid state shear extrusion pulverization according to claim 1 wherein said polymeric material is heated to about 75° to about 225° C. prior to applying said normal and shear forces.

9. A process for solid state shear extrusion pulverization according to claim 1 wherein said applying of normal and shear forces is conducted at about ambient temperature and pressure.

10. A process for solid state shear extrusion pulverization according to claim 1 wherein said fine powder is fluidized in a gas stream for conveyance of said powder from said meshing screws.

11. A process for solid state shear extrusion pulverization according to claim 10 wherein said gas stream is at a lower temperature than said fine powder thereby cooling said fine powder.

12. A process for solid state shear extrusion pulverization according to claim 1 wherein said polymeric material is heated to a temperature above ambient and below its decomposition temperature prior to applying said normal and shear forces, said heated polymeric material is cooled to about 20° to about 100° C. immediately prior to or during applying said normal and shear forces and said fine powder is fluidized in a gas stream for conveyance from said meshing screws.

13. A process for solid state shear extrusion pulverization according to claim 1 wherein said polymeric material is selected from the group consisting of thermosetting polyurethane, polyisocyanurate, phenolic and epoxy polymers and crosslinked thermoplastic polyethylene, polypropylene and polyvinyl chloride polymers.

14. A process for solid state shear extrusion pulverization according to claim 1 wherein said polymeric material is foamed polymeric material.

15. A process for solid state shear extrusion pulverization according to claim 1 comprising the additional step of passing at least the oversized particles of said fine powder for reprocessing through said process.

16. An apparatus for solid state shear extrusion pulverization of polymeric materials comprising; a hollow generally converging barrel housing a generally converging twin screw extruder having generally converging conical meshing screws in at least the powder formation zone, feed means for feeding said polymeric material to a first zone at the large end of said barrel, discharge means for discharging pulverized powder from the opposite small end of said barrel, and generally converging conical meshing screw means for applying normal and shear forces sufficient to form fine powder from said polymeric material in a zone between said first zone and said opposite end of said barrel.

17. An apparatus for solid state shear extrusion pulverization according to claim 16 capable of sufficient said normal and shear forces to obtain up to about 40 MKg torque.

18. An apparatus for solid state shear extrusion pulverization according to claim 16 additionally comprising heating means capable of heating said polymeric material to a temperature above ambient and below its decomposition temperature prior to applying said normal and shear forces.

19. An apparatus for solid state shear extrusion pulverization according to claim 18 wherein said heating means is capable of heating said polymeric material to about 25° to about 225° C.

20. An apparatus for solid state shear extrusion pulverization according to claim 18 additionally comprising cooling means capable of cooling said heated polymeric material to about 20° to about 100° C. immediately prior to or during said applying of said normal and shear forces.

21. An apparatus for solid state shear extrusion pulverization according to claim 16 additionally having fluidizing means for fluidizing said fine powder downstream of said applying of said normal and shear forces in a fluidizing zone.

22. An apparatus for solid state shear extrusion pulverization according to claim 21 wherein said barrel housing has an increasing inner diameter in said fluidizing zone providing expansion of the fluidized powder.

23. An apparatus for solid state shear extrusion pulverization according to claim 21 wherein the distance between flights on said screw extruders is increased in said fluidizing zone providing expansion of the fluidized powder.

24. An apparatus for solid state shear extrusion pulverization according to claim 16 having means for counter rotation of said screws at about 4 to about 90 RPM.

25. An apparatus for solid state shear extrusion pulverization according to claim 16 wherein said generally converging conical meshing screws extend for the full length of said barrel housing.

26. An apparatus for solid state shear extrusion pulverization according to claim 16 having size separation means for separating produced particles over a preset size and conveying means for transporting at least separated oversized particles to a solid state shear extrusion pulverization apparatus as defined in claim 16 for reprocessing.

27. A process for solid state shear extrusion pulverization of polyurethane foam comprising applying normal and shear forces by conically shaped counter-rotating meshing screws rotated at about 4 to about 90 RPM sufficient to form fine powder of said foam.

28. A process for solid state shear extrusion pulverization of polyurethane foam according to claim 27 wherein said applying of normal and shear forces is conducted at about ambient temperature and pressure.

29. A process for solid state shear extrusion pulverization of polyurethane foam according to claim 27 wherein said fine powder is fluidized in a gas stream for conveyance of said powder from said meshing screws.

30. A process for solid state shear extrusion pulverization of polyurethane foam according to claim 27 wherein said polyurethane foam is heated to about 25° to about 100° C. prior to applying said normal and shear forces.

31. A process for solid state shear extrusion pulverization of polyurethane foam according to claim 30 wherein said heated polyurethane foam is cooled to about 20° to about 40° C. immediately prior to or during applying said normal and shear forces.

32. A process for solid state shear extrusion pulverization of polyurethane foam according to claim 27 comprising the additional step of passing at least the oversized particles of said fine powder for processing through said process.

* * * * *